(12) United States Patent
Wakana et al.

(10) Patent No.: US 10,794,706 B2
(45) Date of Patent: Oct. 6, 2020

(54) POSITION DETECTION SYSTEM (71) Applicant: ALPS ALPINE CO., LTD., Tokyo (JP)

(72) Inventors: Keigo Wakana, Miyagi (JP);
Yukimitsu Yamada, Miyagi (JP);
Daisuke Takai, Miyagi (JP)

(73) Assignee: ALPS ALPINE CO., LTD., Tokyo (JP)

(*) Notice: Subject to any disclaimer, the term of this patent is extended or adjusted under 35 U.S.C. 154(b) by 315 days.

(21) Appl. No.: 15/980,914

(22) Filed: May 16, 2018

(65) Prior Publication Data

US 2018/0259340 A1   Sep. 13, 2018

Related U.S. Application Data

(63) Continuation of application No. PCT/JP2016/079776, filed on Oct. 6, 2016.

(30) Foreign Application Priority Data

Dec. 3, 2015   (JP) ................. 2015-236852

(51) Int. Cl.
*G01C 21/14* (2006.01)
*G01C 21/16* (2006.01)
(Continued)

(52) U.S. Cl.
CPC ........... *G01C 21/14* (2013.01); *G01C 21/165* (2013.01); *G01C 21/206* (2013.01); *G01S 5/02* (2013.01); *G01S 5/0263* (2013.01); *G01S 5/14* (2013.01)

(58) Field of Classification Search
CPC .... G01C 21/14; G01C 21/165; G01C 21/206; G01S 5/02; G01S 5/0263; G01S 5/14
(Continued)

(56) References Cited

U.S. PATENT DOCUMENTS 6,132,391 A    10/2000   Onari et al.
7,489,806 B2 *  2/2009   Mohri ................. G06F 3/014
                                         382/103
(Continued)

FOREIGN PATENT DOCUMENTS

EP   2869025      5/2015
JP   S64-006721   1/1989
(Continued)

OTHER PUBLICATIONS

Extended European Search Report for 16870290.0 dated Oct. 24, 2018.
(Continued)

*Primary Examiner* — John H Le
(74) *Attorney, Agent, or Firm* — IPUSA, PLLC (57) ABSTRACT

A position detection system according to an embodiment of the present invention includes a plurality of fixed stations 20; and a sensor unit 10 including an inertial sensor that detects movement history of a mobile body 51 and a distance sensor that detects separation distances between the mobile body 51 and the fixed stations 20. A position of the mobile body 51 is determined by detecting a first arrival position P1 obtained based on the movement history, a second arrival position P2 obtained based on the separation distances, and a relative distance L1 between the first arrival position P1 and the second arrival position P2, and by comparing a range value R1 obtained based on the movement history with the relative distance L1. The range value R1 is changed based on the movement history.

2 Claims, 9 Drawing Sheets

(51) Int. Cl.
*G01C 21/20* (2006.01)
*G01S 5/14* (2006.01)
*G01S 5/02* (2010.01)

(58) Field of Classification Search
USPC ......... 702/104, 141, 150; 342/465; 701/409, 701/469; 455/456.6
See application file for complete search history.

(56) References Cited

U.S. PATENT DOCUMENTS

| | | |
|---|---|---|
| 8,957,812 B1 | 2/2015 | Hill et al. |
| 2007/0150192 A1 | 6/2007 | Wakamatsu et al. |
| 2008/0228395 A1 | 9/2008 | Kobori et al. |
| 2013/0131973 A1 | 5/2013 | Friedler et al. |
| 2015/0119086 A1 | 4/2015 | Mirowski et al. |
| 2015/0201301 A1 | 7/2015 | Takaoka |
| 2016/0050531 A1* | 2/2016 | Choi ................... H04W 4/027 455/456.2 |

FOREIGN PATENT DOCUMENTS

| | | |
|---|---|---|
| JP | H01-312410 | 12/1989 |
| JP | 2006-101290 | 4/2006 |
| JP | 2015-135249 | 7/2015 |

OTHER PUBLICATIONS

International Search Report dated Dec. 20, 2016 in PCT/JP2016/079776 filed on Oct. 6, 2016.

* cited by examiner

○ FIRST ARRIVAL POSITION (P1)

POSITION DETECTION SYSTEM

CROSS-REFERENCE TO RELATED APPLICATIONS

The present application is a continuation application of International Application No. PCT/JP2016/079776 filed on Oct. 6, 2016, which claims priority to Japanese Patent Application No. 2015-236852 filed on Dec. 3, 2015. The contents of these applications are incorporated herein by reference in their entirety.

BACKGROUND OF THE INVENTION

1. Field of the Invention

The present invention relates to a position detection system for detecting a position of an object such as a car, or the like.

2. Description of the Related Art

Figure 8:
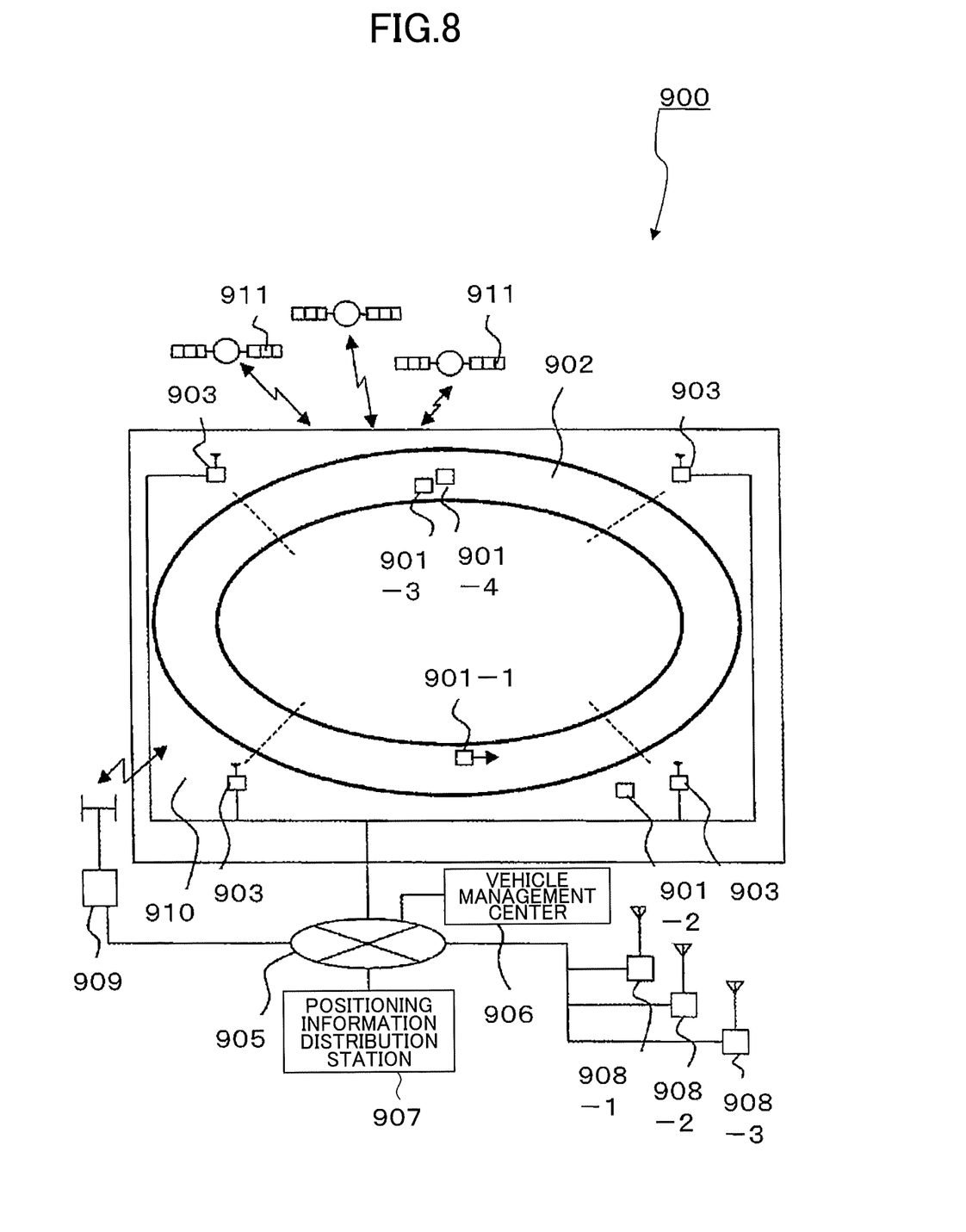
FIG. 8 is a schematic diagram illustrating a position detection system related to a first conventional example.

Conventionally, a position detection system for a mobile body using GPS (Global Positioning System) is known. By using GPS, it is possible to detect a position of a mobile body accurately. A mobile body monitoring system 900 as one of the position detection systems is disclosed in Patent Document 1. A mobile body monitoring system 900 as a first conventional example is illustrated in FIG. 8.

The mobile body monitoring system 900 monitors traveling conditions of a mobile body vehicle (test vehicle) that travels on a test course 902. In FIG. 8, a plurality of test vehicles 901 (901-1, 901-2, 901-3, 901-4) are motorcycles for which a performance test and an endurance test including various traveling tests are performed. Base station radio apparatuses 903 are installed in an area outside the course 910. The base station radio apparatuses 903 are installed along the circumference of the course at several positions (four positions in the figure) with a predetermined space next to each other, and perform communications with the test vehicles 901.

The base station radio apparatuses 903 are connected to a plurality of electronic reference stations 908 (908-1, 908-2, 908-3) via a network. GPS antennas and GPS receivers are included in the electronic reference stations 908. In each of the electronic reference stations 908, received data is calculated and processed by a computer, and an accurate installation location of the electronic reference station 908 is identified. The GPS receivers included in the electronic reference stations 908 obtain GPS observation data from GPS satellites 911.

In the mobile body monitoring system 900 as described above, it is possible to detect a fall accident of a motorcycle traveling on the test course or detect an abnormality of a vehicle such as a deviation from the test course, and it is possible to accurately determine a traveling position (location) of a motorcycle. In other words, it is possible to accurately detect a position of a mobile body traveling on the outdoor test course by using GPS.

However, in the case where this type of position detection system is adopted as a position detection system used for a mobile body moving in a warehouse, GPS cannot be used because radio waves from GPS are shut off by the structure of the warehouse. Therefore, a position detection system like a mobile body monitoring system 900 cannot be adopted.

Figure 9:
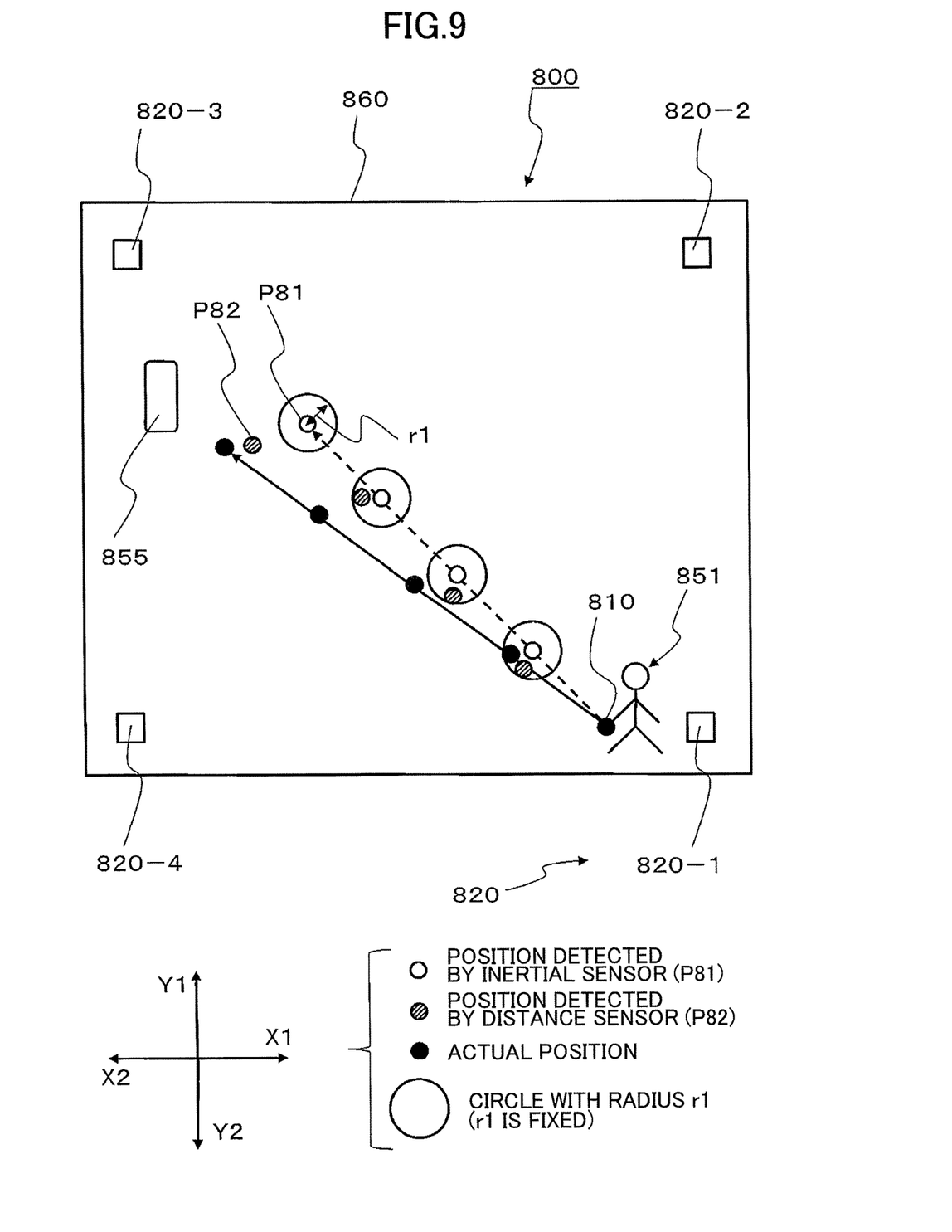
FIG. 9 is a schematic diagram illustrating a position detection system related to a second conventional example.

With respect to the above, as a position detection system used for a mobile body moving in a warehouse, a system is considered in which positions are detected by using an inertial sensor and a distance sensor (RF (Radio Frequency) sensor) without using GPS. As a second conventional example of this type of position detection system, a position detection system 800 is illustrated in FIG. 9.

The position detection system 800 includes a plurality of fixed stations 820 (820-1, 820-2, 820-3, 820-4) provided at four corners of a warehouse 860. In the position detection system 800, a position detection worker as a mobile body 851, carrying a sensor unit 810 including an inertial sensor and a distance sensor, moves towards a position detection target object 855 in the warehouse.

In the position detection system 800, a positioning result P81 and a positioning result P82 are obtained. The positioning result P81 is obtained by using the inertial sensor and the positioning result P82 is obtained by using the plurality of the fixed stations 820 and the distance sensor.

However, a non-insignificant error occurs in the positioning result according to the inertial sensor. Further, there is a possibility that the positioning result according to the distance sensor is affected by multipathing. Therefore, there is a case in which the positioning result P81 according to the inertial sensor and the positioning result P82 according to the distance sensor are both different from the actual position. With respect to the above, as a method of detecting a position of the mobile body 851, a method is used in which the position P81 obtained by using the inertial sensor is compared with the position P82 obtained by using the distance sensor, and one of the position P81 and the position 82, which is deemed to be closer to the actual position, is adopted.

In the position detection system 800, first, a circle with radius r1 and with center position P81 obtained by using the inertial sensor, is set, and then, it is determined whether the position P82 obtained by using the distance sensor is within the circle with radius r1. The radius r1 is determined by considering an error that occurs in the positioning result according to the inertial sensor. Further, in the case where the position P82 obtained by using the distance sensor is within the circle with radius r1, the position P82 obtained by using the distance sensor is adopted as a position of the mobile body 851, and, in the case where the position P82 obtained by using the distance sensor is not within the circle with radius r1, the position P81 obtained by using the inertial sensor is adopted as the position of the mobile body 851.

In the position detection system as described above, by determining the position by combining the inertial sensor and the distance sensor, it is possible to detect one of the positioning result according to the inertial sensor and the positioning result according to the distance sensor, that is more accurate than the other.

CITATION LIST

Patent Document

[Patent Document 1] Japanese Unexamined Patent Application Publication No. 2006-101290

SUMMARY OF THE INVENTION

Technical Problem

In the position detection system 800, the size of the radius r1, which is determined by considering the error that occurs in the positioning result according to the inertial sensor, is constant. However, in the positioning result according to the inertial sensor, in the case where the worker as a mobile body moves in the warehouse, errors are accumulated as the moved distance increases, and thus, there is a problem in that the error that occurs in the positioning result gradually increases.

Therefore, in the position detection system 800, when the moved distance of the mobile body increases, the position obtained by the inertial sensor may be adopted as the position of the moving body even in the case where the positioning result obtained by the distance sensor is closer to the actual position than the position obtained by the inertial sensor is. As a result, there is a problem in that a significant error occurs in the positioning result.

In view of the above, the present invention has been made, and an object of the present invention is to provide a position detection system capable of detecting the position of a mobile body accurately even in the case where the mobile body moves in the warehouse.

Solution to Problem

In order to solve the above problem, a position detection system according to an embodiment of the present invention includes a plurality of fixed stations; and a sensor unit including an inertial sensor that detects movement history of a mobile body and a distance sensor that detects separation distances between the mobile body and the fixed stations. A position of the mobile body is determined: by detecting a first arrival position obtained based on the movement history, a second arrival position obtained based on the separation distances, and a relative distance between the first arrival position and the second arrival position; and by comparing a range value, obtained based on the movement history, with the relative distance. The range value is changed based on the movement history.

In the position detection system described above, the relative distance between the first arrival position based on the movement history detected by the inertial sensor and the second arrival position based on the separation distances detected by the distance sensor, is compared with the range value obtained based on the movement history, and the range value is changed according to the degree of an error related to the inertial sensor. Therefore, it is possible to detect the position of the mobile body accurately.

Further, in the position detection system described above, the second arrival position is adopted as the position of the mobile body when the relative distance is within the range value, and the first arrival position is adopted as the position of the mobile body when the relative distance exceeds the range value.

In the position detection system described above, the position of the mobile body is determined with reference to the range value. Therefore, it is possible to detect the position of the mobile body more accurately.

Further, in the position detection system described above, the range value is increased according to the movement history, and, when the adopted position of the mobile body is switched from the first arrival position to the second arrival position, the range value is returned to an initial value of the range value.

In the position detection system described above, when the adopted position of the mobile body is switched from the first arrival position to the second arrival position, the range value is returned to an initial value of the range value. Therefore, it is possible to accurately determine the position of the mobile body even when the moved distance of the mobile body increases.

Further, in the position detection system described above, the inertial sensor includes an angular velocity sensor that detects a traveling angle by detecting an angular velocity of the moving mobile body, and includes an acceleration sensor that detects a moved distance by detecting the acceleration of the moving mobile body.

In the position detection system described above, the inertial sensor includes the angular velocity sensor and the acceleration sensor. Therefore, it is possible to detect a position of the mobile body easily.

Advantageous Effects of Invention

In a position detection system according to an embodiment of the present invention, the relative distance between the first arrival position based on the movement history detected by the inertial sensor and the second arrival position based on the separation distances detected by the distance sensor, is compared with the range value obtained based on the movement history; and the range value is changed according to the degree of an error related to the inertial sensor. Therefore, it is possible to detect the position of the mobile body accurately.

DETAILED DESCRIPTION OF THE PREFERRED EMBODIMENTS

Figure 1:
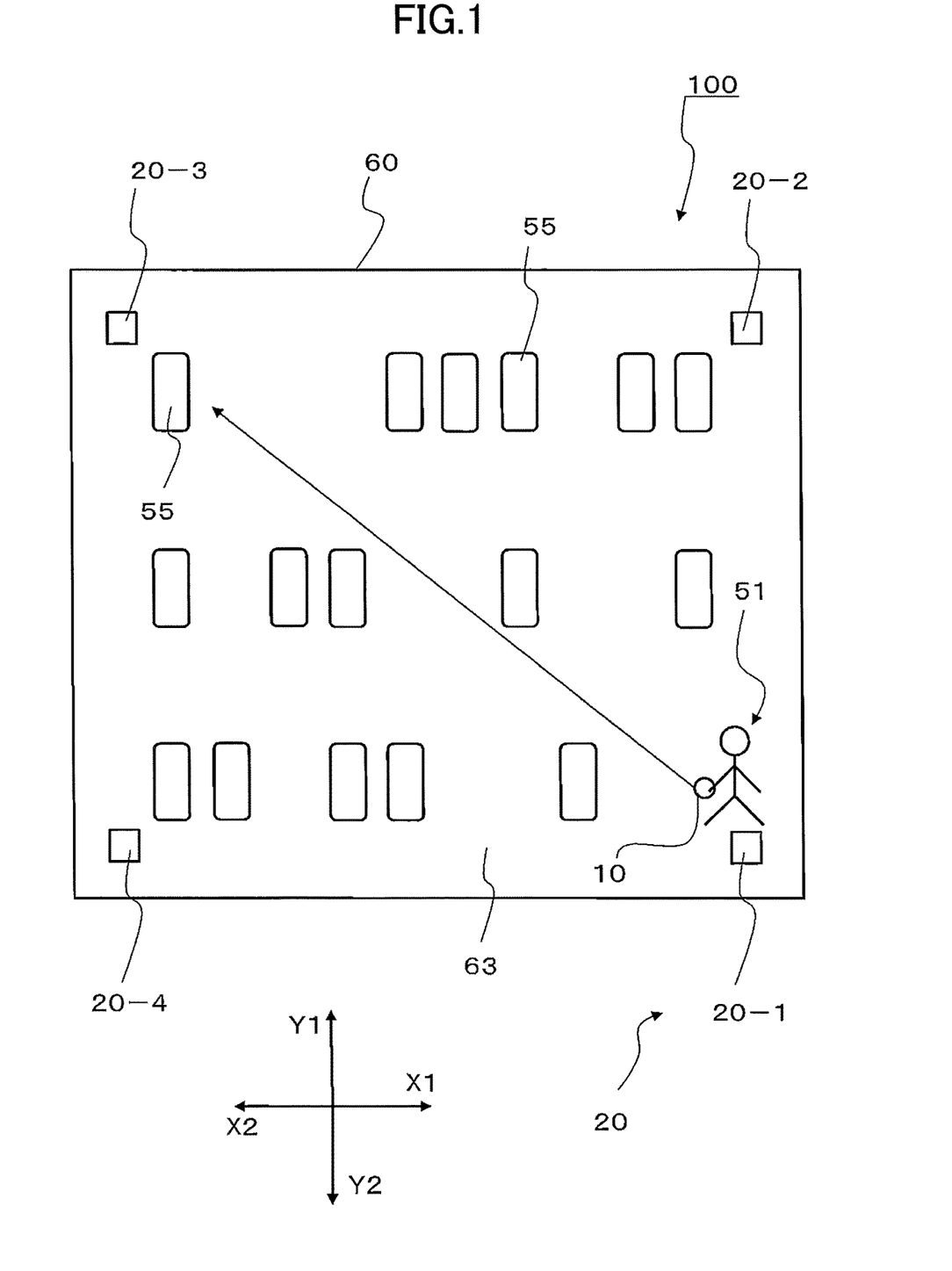
FIG. 1 is a schematic diagram illustrating a position detection system according to an embodiment of the present invention.

In the following, a position detection system 100 according to an embodiment of the present invention will be described while making reference to the drawings. The position detection system 100 is used for, for example, detecting a position of an object such as a car (vehicle) that is being brought in a warehouse. In particular, the position detection system 100 relates to a system used in a case in which a position detection worker as a mobile body moves towards a target object in the warehouse. It should be noted that use of the position detection system 100 is not limited to the above, and may be changed appropriately. Further, in the present specification, unless otherwise noted in particular, the X1 side in each drawing is referred to as a "right side", the X2 side is referred to as a "left side", the Y1 side is referred to as a "back side", the Y2 side is referred to as a "front side". First, an overall structure of the position detection system 100 will be described while making reference to FIG. 1. Further, a structure of a sensor unit 10 and a structure of a fixed station 20 will be described while making reference to FIG. 2 and FIG. 3. FIG. 1 is a schematic diagram illustrating a structure of the position detection system 100. FIG. 1 is a schematic diagram when a warehouse 60, in which a position detection target object 55 has been brought, is viewed from the top. It is assumed that the target object 55 is a vehicle such as a private car, a truck, etc. However, the target object 55 may be a motor cycle, or a commodity in a physical distribution base.

As illustrated in FIG. 1, the position detection system 100 is included in the warehouse 60 in which the target object 55 such as a vehicle has been brought. The warehouse 60 is constructed with reinforced concrete, and the parking space 63 is surrounded by concrete walls. As a result, radio waves from outside are shut off, and a position detection method using GPS cannot be adopted.

In the parking space 63 of the warehouse 60, one or more target objects, for which management of the parking positions is required, have been brought in. The parking positions are not necessarily determined in advance. As a result, the target objects 55 and other vehicles, for which management is required, are located at random. Therefore, it is necessary to detect which locations in the parking space 63 the management-required target objects 55 are parked.

As illustrated in FIG. 1, in order to detect the locations of the target objects 55 that have been brought in the warehouse 60, a position detection worker as a mobile body 51 moves towards the target object 55 in the warehouse 60. The mobile body 51 has a sensor unit 10 for position detection. When the mobile body 51 arrives at a position at which the target object 55 is located, the position of the mobile body 51 is determined as a position of the target object 55.

A plurality of fixed stations 20 are provided on the upper part of the four corner walls of the warehouse 60 illustrated in FIG. 1. The plurality of the fixed stations 20 include a first fixed station 20-1 that is provided on the front right side, a second fixed station 20-2 that is provided on the rear right side, a third fixed station 20-3 that is provided on the rear left side, and a fourth fixed station 20-4 that is provided on the front left side. The internal structures of the first fixed station 20-1, the second fixed station 20-2, the third fixed station 20-3, and the fourth fixed station 20-4 are the same as each other except for their IDs. It should be noted that four fixed stations 20 are provided in an embodiment of the present invention. However, the fixed stations 20 may be provided in at least three locations. Further, in the case where pillars are provided inside the warehouse 60, in order to avoid a communication failure, additional fixed stations 20 may be provided.

Figure 2:
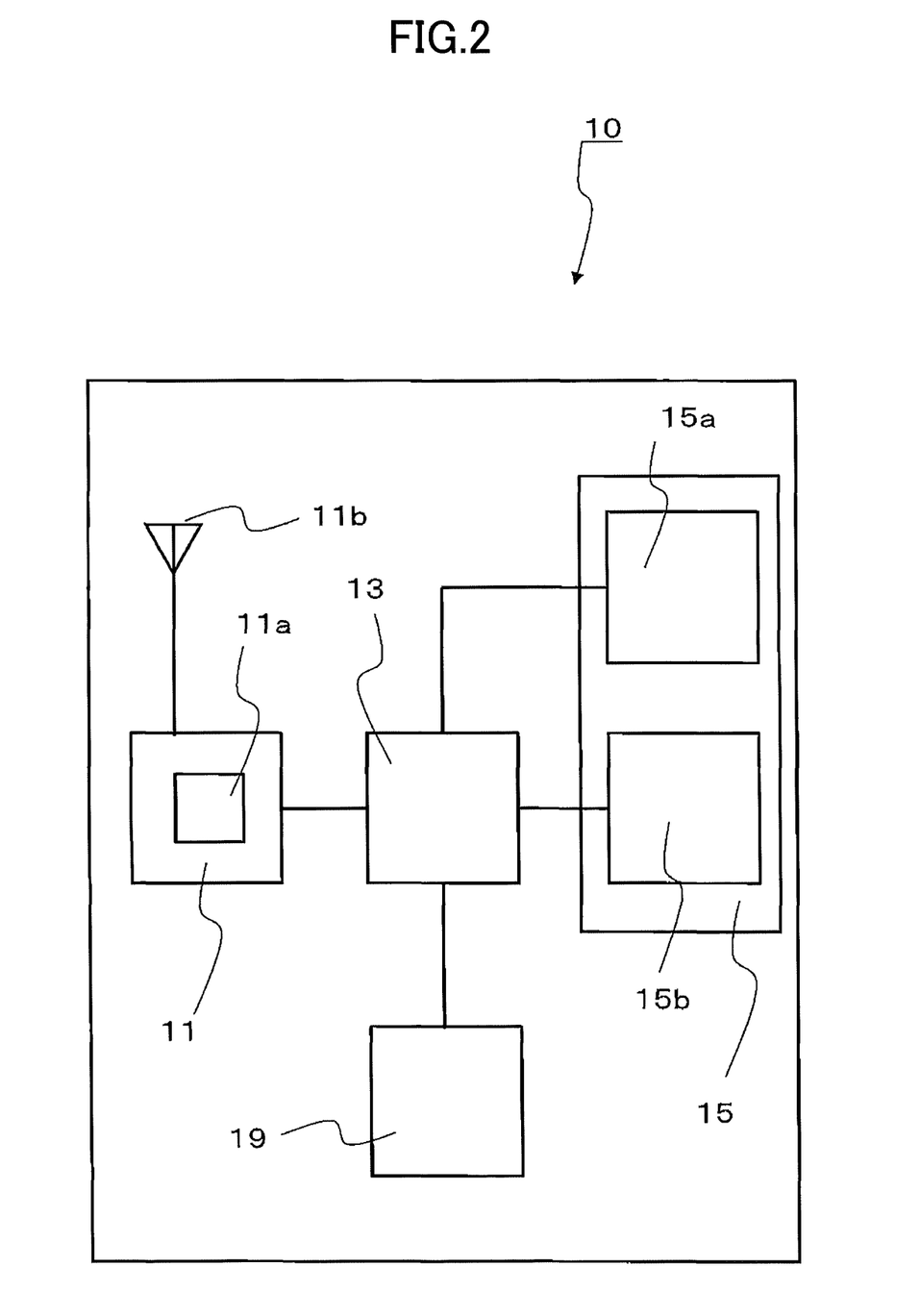
FIG. 2 is a block diagram illustrating a structure of a sensor unit.
Figure 3:
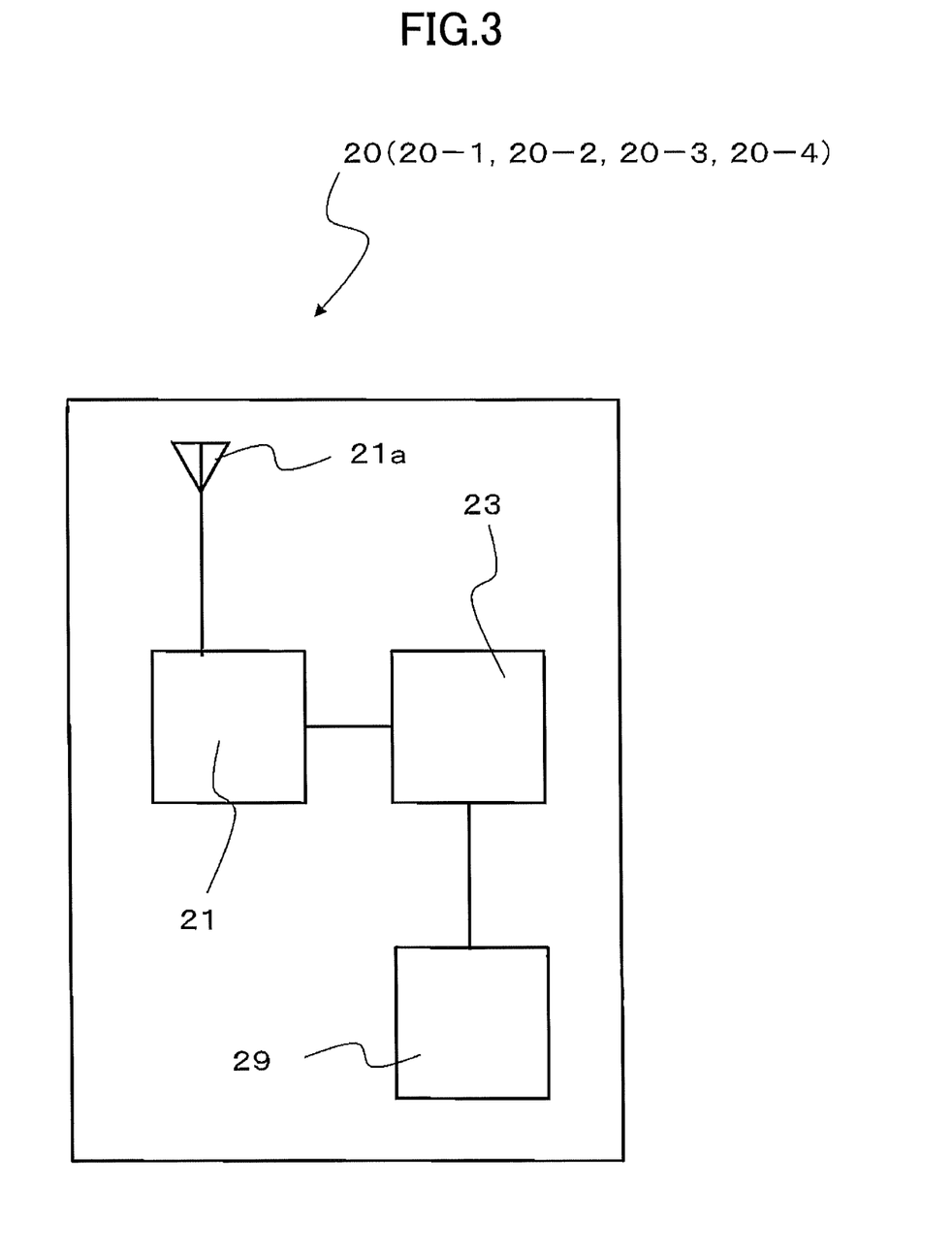
FIG. 3 is a block diagram illustrating a structure of a fixed station.

FIG. 2 is a block diagram illustrating a structure of the sensor unit 10, and FIG. 3 is a block diagram illustrating a structure of the fixed station 20.

As illustrated in FIG. 2, the sensor unit 10 includes a sensor unit RF circuit 11, a sensor unit controller 13, an inertial sensor 15, and a sensor unit memory 19. The inertial sensor 15 includes an angular velocity sensor 15a and an acceleration sensor 15b. The sensor unit RF circuit 11, the angular sensor 15a, the acceleration sensor 15b and the sensor unit memory 19 are each connected to the sensor unit controller 13.

The sensor unit RF circuit 11 includes a distance sensor 11a and a transmission-and-reception antenna 11b, communicates with a plurality of fixed stations 20 illustrated in FIG. 1, and is enabled to detect a separation distance between the mobile body 51 and each of the fixed stations 20.

The angular velocity sensor 15a of the inertial sensor 15 detects an angular velocity of the moving mobile body 51, and detects the traveling angle. Further, the acceleration sensor 15b counts the number of steps by detecting impacts in Z direction (direction orthogonal to X direction and Y direction), and detects a moved distance according to "the number of steps*stride length (predetermined value)=moved distance". It should be noted that, as a calculation method of the moved distance, there is another method in which the acceleration sensor 15b detects the velocity of the moving mobile body 51 by detecting the acceleration of the moving mobile body 51, and the moved distance is detected according to the detected velocity.

The inertial sensor 15 is enabled to detect the position of the mobile body 51 according to the traveling angle and the moved distance that have been detected as described above. In other words, the inertial sensor 15 detects the position of the mobile body 51 based on the movement history of the mobile body 51. The sensor unit memory 19 of the sensor unit 10 stores an ID given to each sensor unit 10.

As illustrated in FIG. 3, each of the plurality of the fixed stations 20 (i.e., the first fixed station 20-1, the second fixed station 20-2, the third fixed station 20-3, and the fourth fixed station 20-4) includes a fixed station RF circuit 21, a fixed station controller 23, and a fixed station memory 29. The fixed station RF circuit 21 and the fixed station memory 29 are each connected to the fixed station controller 23. The fixed station RF circuit 21 is provided for detecting a separation distance between the mobile body 51 and each of the fixed stations 20. A transmission and reception antenna 21a is attached to the fixed station RF circuit 21. Individual IDs given to the fixed stations 20 are stored in the fixed station memories 29. Further, an ID given to the sensor unit 10 is also stored in the fixed station memories 29.

Next, a method of detecting and determining the position of the mobile body 51 will be described while making reference to FIG. 2 through FIG. 7. According to an embodiment of the present invention, a method is used in which the position is determined by comparing two arrival positions: a first arrival position P1 obtained based on the movement history of the mobile body 51 detected by the inertial sensor 15 (refer to FIG. 4); and a second arrival position P2 obtained based on the separation distances between the distance sensor 11a and the plurality of the fixed stations 20 (refer to FIG. 5).

Figure 4:
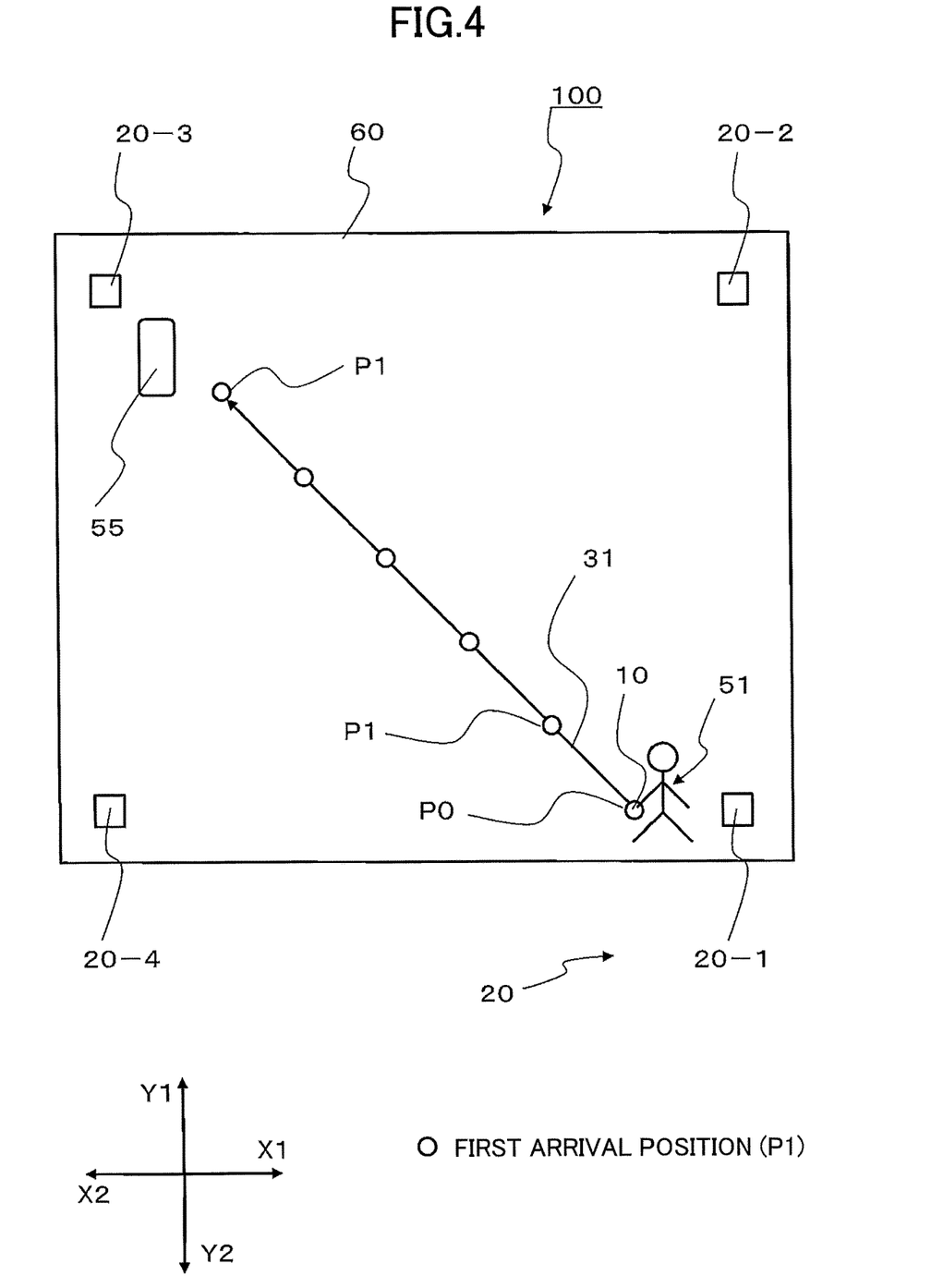
FIG. 4 is a schematic diagram illustrating a position detection method according to an inertial sensor.

First, a method of detecting the first arrival position P1 will be described while making reference to FIG. 2 and FIG. 4. FIG. 4 is a schematic diagram illustrating a position detection method for the first arrival position P1.

As illustrated in FIG. 4, it is assumed that the initial position of the mobile body 51 (i.e., the start position of the sensor unit 10) is a reference position P0. The mobile body 51 including the sensor unit 10 starts from the reference position P0, moves towards the target object 55 in the warehouse 60, and arrives at the first arrival position P1.

The angular velocity sensor 15a of the inertial sensor 15 in the sensor unit 10 illustrated in FIG. 2 detects angular velocities of the moving mobile body 51 on a movement trajectory 31 at predetermined time intervals, and detects traveling angles of the mobile body 51 at corresponding positions to which the mobile body 51 has moved from the starting point (the reference position P0), by calculating the integral of the detected angular velocities.

Further, as described above, the acceleration sensor 15b counts the number of steps by detecting impacts in Z direction (direction orthogonal to X direction and Y direction), and detects a moved distance according to "the number of steps*stride length (predetermined value)=moved distance". It should be noted that the stride length is calculated in advance by multiplying the height of the position detection worker as the mobile body 51 by a predetermined coefficient.

The integral of the angular velocity is calculated by the sensor unit controller 13 of the sensor unit 10 illustrated in FIG. 1. Further, the first arrival position P1 with respect to the reference position P0 is calculated by the sensor unit controller 13 by calculating the detected traveling angles and the moved distances of the mobile body 51. In this way, the first arrival position P1 is detected for the first time. The first arrival position P1 is stored in the sensor unit memory 19 of the sensor unit 10 illustrated in FIG. 2. By repeating the detection method as described above, it is possible to obtain the first arrival position P1 corresponding to the final position of the arrival position of the mobile body 51.

Figure 5:
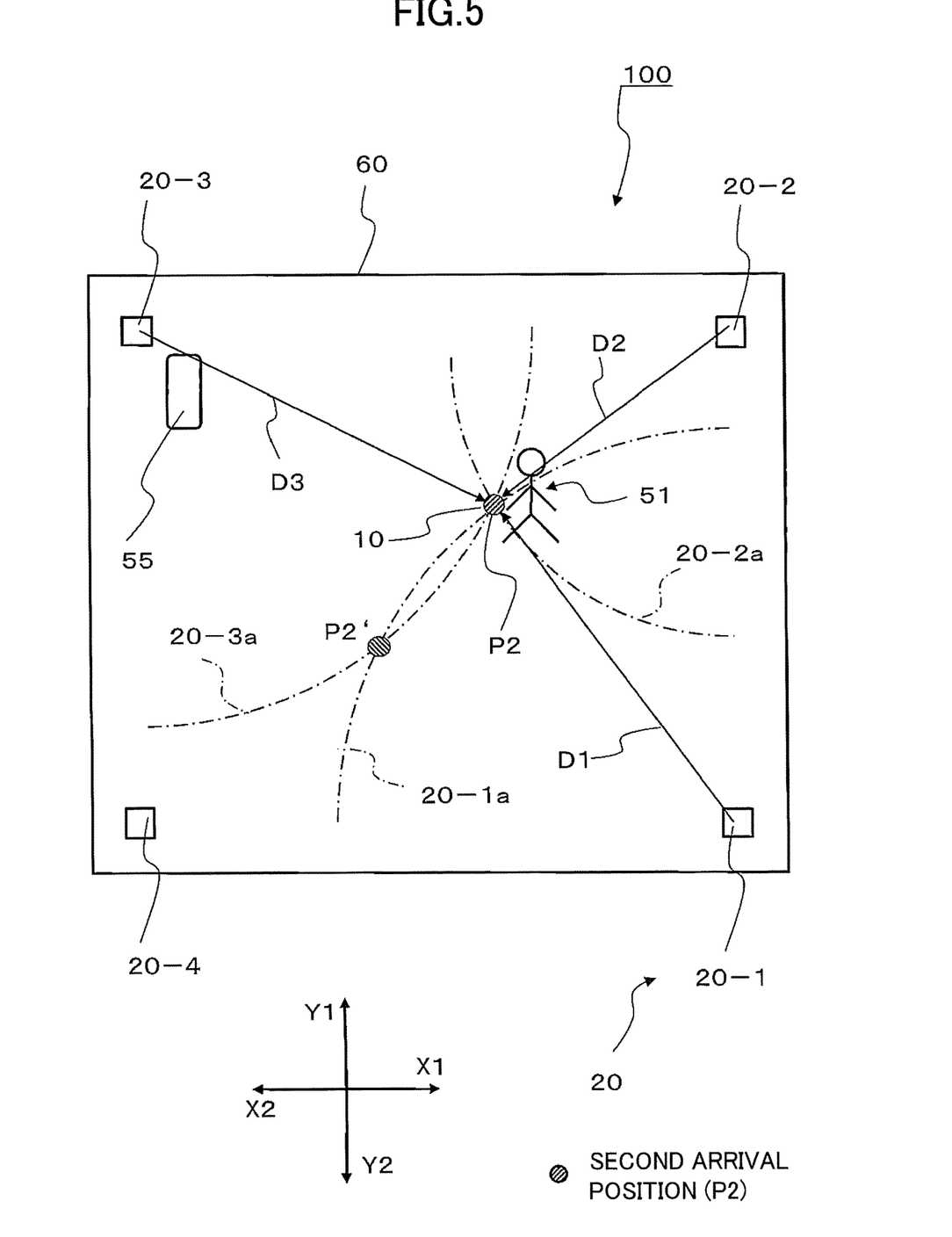
FIG. 5 is a schematic diagram illustrating a position detection method according to a distance sensor.

Next, a method of detecting the second arrival position P2 will be described while making reference to FIG. 2, FIG. 3 and FIG. 5. FIG. 5 is a schematic diagram illustrating a position detection method according to communications between the sensor unit 10 and the plurality of the fixed stations 20. It should be noted that the required (sufficient) number of the fixed stations 20 illustrated in FIG. 5 is three (3). Therefore, in an embodiment of the present invention, the first fixed station 20-1, the second fixed station 20-2, and the third fixed station 20-3 that are relatively closer to the sensor unit 10 are used.

A transmission and reception unit capable of transmitting and receiving communication signals (RF signals) is included in each of the sensor unit RF circuit 11 of the sensor unit 10 illustrated in FIG. 2 and the fixed station RF circuit 21 of the fixed station 20 illustrated in FIG. 3.

As illustrated in FIG. 5, the mobile body 51 including the sensor unit 10 moves towards the target object 55 in the warehouse 60, and arrives at the second arrival position P2. At this time, the sensor unit RF circuit 11 illustrated in FIG. 2 transmits a measurement signal via the transmission and reception antenna lib at a timing indicated by the sensor unit controller 13. The measurement signal is used for measuring separation distances D1, D2, and D3, that are distances between the mobile body 51 and the fixed stations 20 (i.e., the first fixed station 20-1, the second fixed station 20-2, the third fixed station 20-3).

As described above, an ID is given to the sensor unit 10 held by the mobile body 51, and the ID is stored in advance in the sensor unit memory 19. The measurement signal, in which the ID is included, is transmitted to each of the fixed stations 20. It is possible for each of the fixed stations 20 to identify the mobile body 51 by matching the ID included in the transmitted measurement signal with the ID given to the sensor unit 10 held by the mobile body 51, the ID being stored in the fixed station memory 29 of the fixed station 20.

When the fixed station RF circuit 21 of the first fixed station 20-1 illustrated in FIG. 3 receives the measurement signal transmitted from the sensor unit RF circuit 11 of the sensor unit 10 illustrated in FIG. 2 via the transmission and reception antenna 21a, the fixed station controller 23 measures the signal strength of the received measurement signal and transmits the measurement result as a response signal via the fixed station RF circuit 21 and the transmission and reception antenna 21a.

When the response signal is received by the sensor unit RF circuit 11 of the sensor unit 10 illustrated in FIG. 2 via the transmission and reception antenna lib, the distance sensor 11a, the sensor unit controller 13 calculates a separation distance D1 between the sensor unit 10 and the first fixed station 20-1 based on the signal strength detected by the fixed station RF circuit 21 of the first fixed station 20-1. (Refer to FIG. 5) Afterwards, the separation distance D1 is stored in the sensor unit memory 19. It should be noted that, as the calculation method of the separation distance D1, there are methods of calculation based on a phase difference, based on an optical method, based on an ultrasonic method, etc., other than the method of calculation based on the signal strength.

Similar to the case of the first fixed station 20-1, the second fixed station 20-2 and the third fixed station 20-3 calculate the separation distance D2 between the sensor unit 10 and the second fixed station 20-2, and the separation distance D3 between the sensor unit 10 and the third fixed station 20-3, respectively, and store the calculated separation distances D2 and D3 in the respective sensor unit memories 19.

As illustrated in FIG. 5, the separation distance D1 between the sensor unit 10 and the first fixed station 20-1 can be indicated by a first arc 20-1a having the first fixed station 20-1 as the center point. Therefore, the sensor unit 10 is on the first arc 20-1a. Further, the separation distance D2 between the sensor unit 10 and the second fixed station 20-2 can be indicated by a second arc 20-2a having the second fixed station 20-2 as the center point. Therefore, the sensor unit 10 is on the second arc 20-2a. Further, the separation distance D3 between the sensor unit 10 and the third fixed station 20-3 can be indicated by a second arc 20-3a having the third fixed station 20-3 as the center point. Therefore, the sensor unit 10 is on the third arc 20-3a.

As a result, the position of the sensor unit 10 in the warehouse 60 is an intersection point of the first arc 20-1a, the second arc 20-2a, and the third arc 20-3a, and it is possible to detect the second arrival position P2 of the sensor unit 10. In other words, the second arrival position P2 is obtained based on the separation distances D1, D2, and D3 between the sensor unit 10 and the fixed stations 20.

It should be noted that, for example, as the intersection point between the first arc 20-1a and the third arc 20-3a according to the two fixed stations 20 (the first fixed station 20-1 and the third fixed station 20-3), there is also a position P2'. However, in this case, the position P2' is not a correct position. The second arrival position P2 as a correct position of the sensor unit 10 can be obtained, not only by obtaining intersection points between the first arc 20-1a according to the first fixed station 20-1 and the third arc 20-3a according to the third fixed station 20-3, but also by obtaining intersection points related to the second arc 20-2a according to the second fixed station 20-2.

It should be noted that it is possible to detect the start position of the sensor unit 10 (i.e., the reference position P0) in the method for detecting the first arrival position P1 as illustrated in FIG. 4, by using the same method used for detecting the second arrival position P2 using the distance sensor 11a and the plurality of the fixed stations 20 as described above. The detected reference position P0 is stored in the sensor unit memory 19 and in the fixed station memory 29 of each of the fixed stations 20.

As described above, the warehouse 60, in which the position detection target object 55 is stored, is constructed with reinforced concrete. Therefore, the above-described measurement signal transmitted from the sensor unit RF circuit 11 and the above-described response signals transmitted from the fixed station RF circuits 21 are reflected by the ceiling, the floor, and the four side walls of the warehouse 60 made of concrete, and thus, multipathing tends to occur. Therefore, the second arrival position P2 detected by the distance sensor 11a as described above does not necessarily indicate an accurate position due to the multipathing effects.

Further, as described above, the movement history used for detecting the first arrival position P1 is obtained by detecting the angular velocities and the accelerations of the moving mobile body 51, by calculating the integral of the detected angular velocities, and by using the number of steps obtained by the detected accelerations and a predetermined stride length. In general, when the integral of the angular velocities or the accelerations is calculated, the calculated integral value includes a non-insignificant error, and the error is accumulated every time the integral is calculated. Therefore, the first arrival position P1 detected by the inertial sensor 15 as described above does not necessarily indicate an accurate position.

Therefore, in the position detection system 100, the determined position of the mobile body 51 is caused to be more accurate: by detecting a relative distance between the first arrival distance P1 and the second arrival distance P2; by determining the position of the mobile body 51 by comparing a range value obtained based on the movement history with the relative distance; and by changing the range value based on the movement history of the mobile body 51.

Figure 6:
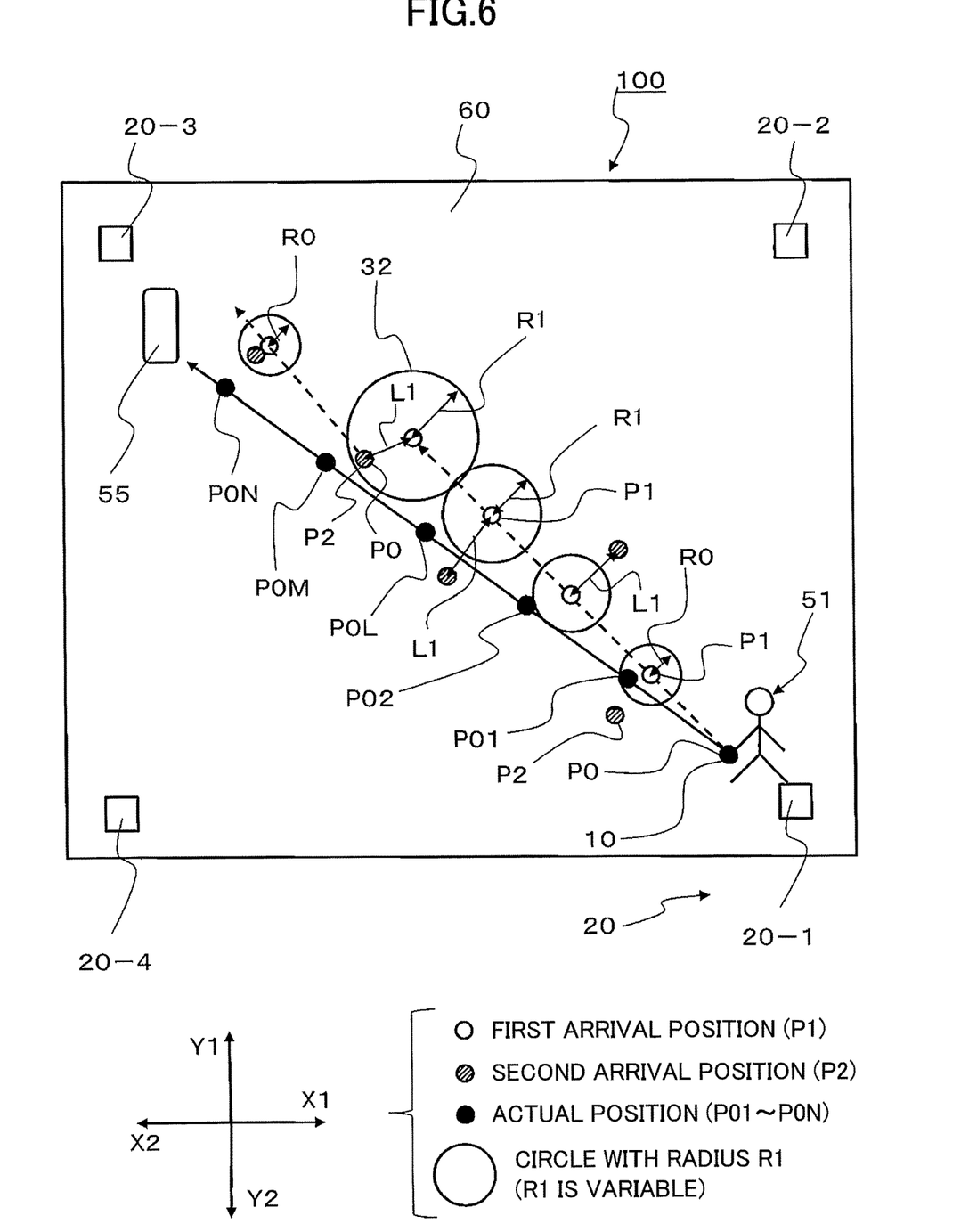
FIG. 6 is a schematic diagram related to a determination method of detected position.
Figure 7:
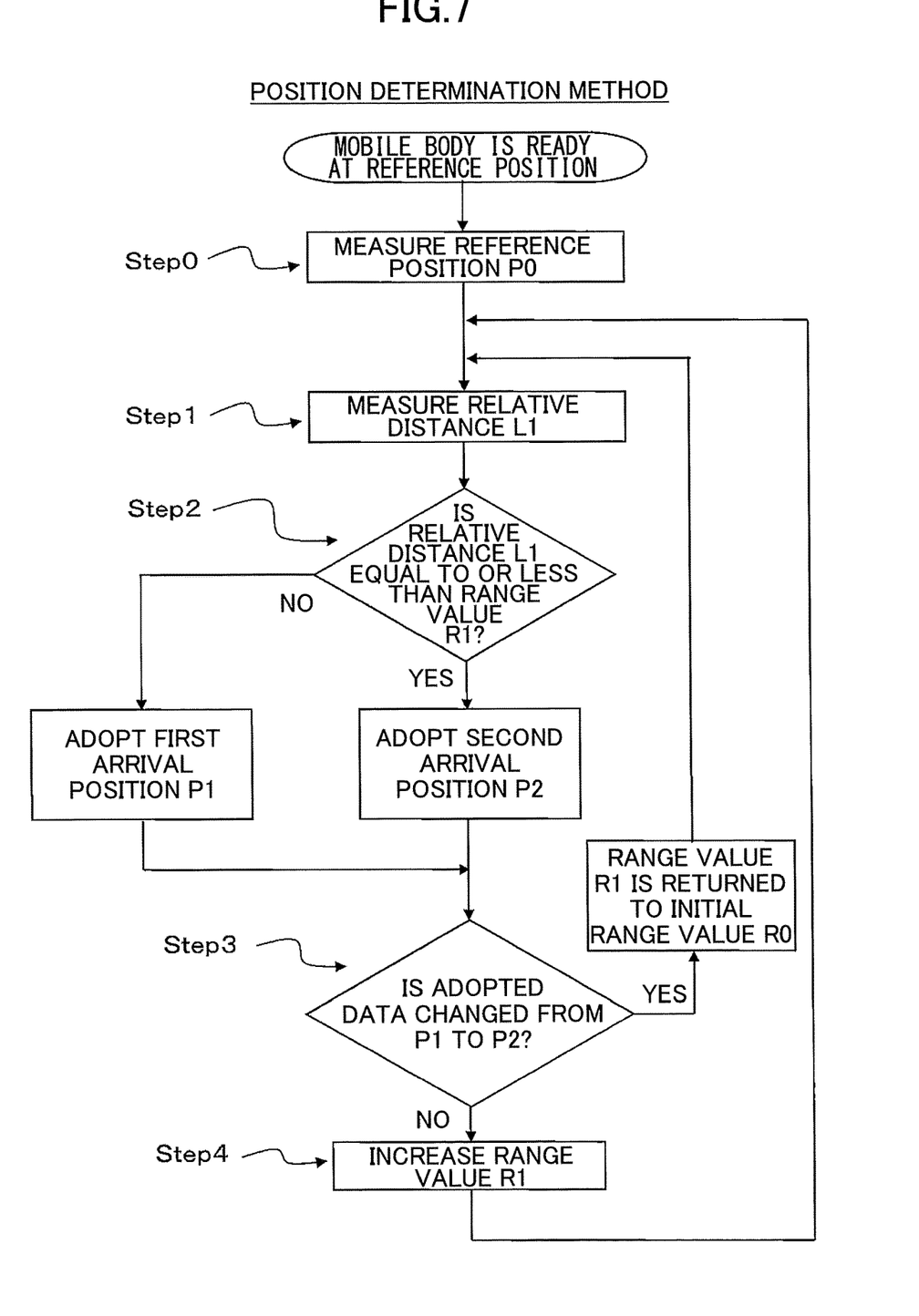
FIG. 7 is a flowchart related to a determination method of detected position.

A specific method of determining the position of the mobile body 51 will be described while making reference to FIG. 6 and FIG. 7. FIG. 6 is a schematic diagram related to a detected position determination method. FIG. 7 is a flowchart related to the detected position determination method. In FIG. 6, the first arrival position P1 of the mobile body 51, the second arrival position P2, and the actual position of the mobile body 51 (P0-P0N) are illustrated together. Further, in FIG. 6, relative distances L1 between the first arrival position P1 and the second arrival position P2, and circles 32 having the first arrival position P1 as the center point and having the range value R1 as the radius, are illustrated together. Further, in FIG. 6, the target object 55 and the fixed stations 20 at the four corners of the warehouse 60 are also illustrated. It should be noted that the range value R1 can be indicated as the radius of the circle 32 having the first arrival position P1 as the center point. Further, the range value R1 as the radius of the circle 32 varies according to the position of the first arrival position P1.

Hereinafter, a method of detecting the position of the mobile body 51 using the inertial sensor 15 as described above is referred to as a first detection method, and a method of detecting the position of the mobile body 51 according to communications between the distance sensor 11a and the fixed stations 20 is referred to as a second detection method.

The first arrival position P1 of the mobile body 51 according to the first detection method is not necessarily the same as the second arrival position P2 of the mobile body 51 according to the second detection method. The reason is because the first arrival position P1 is affected by an error related to calculating the integral of the angular velocities and using the number of steps obtained by the accelerations and the predetermined stride length, and because the second arrival position P2 is affected by the multipathing. Therefore, there is a relative distance L1 between the first arrival position P1 and the second arrival position P2.

In the position detection system 100, processes are performed according to the following steps. It should be noted that, after step 0, processes of Steps 1 to 4 are performed at every measurement time.

Step 0: the reference position P0 is measured, and the position of the reference position P0 is determined.

Step 1: the relative distance L1 between the first arrival position P1 and the second arrival position P2 is measured.

Step 2: the second arrival position P2 is adopted as an arrival position when the relative distance L1 is within the range value R1, and the first arrival position P1 is adopted as the arrival position when the relative distance L1 exceeds the range value R1.

Step 3: when the adopted data position is changed from the first arrival position P1 to the second arrival position P2, the range value R1 is returned to an initial range value R0, and return to Step 1, otherwise, proceed to Step 4.

Step 4: the range value R1 is increased, and return to Step 1.

The measurement of the reference position P0 in Step 0 is performed according to the second detection method as described above, that is, according to a method using the distance sensor 11a and the fixed stations 20. According to the measurement described above, the reference position P0 as an initial position of the mobile body 51 is determined.

The mobile body 51 including the sensor unit 10 starts from the reference position P0 and moves towards the target object 55 in the warehouse 60. Further, as illustrated in FIG. 6, the mobile body 51 arrives at the first moved position P01 (actual position). At this time, the first arrival position P1 (first time) is obtained according to the first detection method, and the second arrival position P2 (first time) is obtained according to the second detection method. The relative distance L1 in Step 1 is obtained by calculating a difference between the first arrival position P1 and the second arrival position P2. It should be noted that the mobile body 51 does not yet arrive at the target object 55 when the mobile body 51 is at the first moved position P01.

It is assumed that the range value R1 at the moved position P01 is the initial range value R0. The initial range value R0 is set as a smallest value of the variable range values R1 because the error, generated by the integral of the angular velocities, the number of steps, and the stride length, has not been accumulated.

In Step 2 for the moved position P01, it is determined whether or not the relative distance L1 is within the range value R1 (i.e., within the initial range value R0). The second arrival position P2 is adopted as position data when the relative distance L1 is within the initial range value R0, and the first arrival position P1 is adopted as the position data when the relative distance L1 exceeds the initial range value R0.

In an example illustrated in FIG. 6, the first arrival position P1 is adopted as the position data because the relative distance L1 exceeds the initial range value R0. It should be noted that there is no change in the adopted data because this is the first time arrival position detection. Therefore, in Step 3, it is determined that the adopted data is not changed from P1 to P2, and proceeds to Step 4.

In Step 4, the range value R1 is increased from the initial range value R0 to a predetermined range value R1. Then, return to Step 1.

Next, the mobile body 51 moves from the moved position P01 to, for example, a moved position P02 as illustrated in FIG. 6. At this time, the first arrival position P1 is obtained according to the first detection method, the second arrival position P2 is obtained according to the second detection method, and, the relative distance L1 is calculated in Step 1. Further, the first arrival position P1 or the second arrival position P2 is adopted according to the relative distance L1.

For example, as illustrated in FIG. 6, the first arrival position P1 is adopted as the position data in the case where the relative distance L1 at the time of moved position P02 exceeds the corresponding range value R1. Further, in the determination in step 3, it is determined that the adopted data is not changed "from P1 to P2", and thus, proceed to Step 4, the range value R1 is increased and set as a predetermined range value R1. Then, return to Step 1 again.

In this way, after performing the above processing several times, as illustrated in FIG. 6, the mobile body 51 moves to, for example, a moved position P0L, the first arrival position P1 and the second arrival position P2 are detected, and the relative distance L1 is calculated in Step 1. Further, there is a case in which the relative distance L1 at the time of the moved position P0L exceeds the range value R1 at that same time. In this case, the first arrival position P1 is adopted as the position data, but, in the determination in Step 3, it is determined that the adopted data is not changed "from P1 to P2". Therefore, also in this case, proceed to Step 4, the range value R1 is increased and set as a predetermined range value R1. Then, return to Step 1 again.

Next, as illustrated in FIG. 6, the mobile body 51 moves to, for example, a moved position P0M, the first arrival position P1 and the second arrival position P2 are detected, and the relative distance L1 is calculated. Further, there is a case in which the relative distance L1 at the time of the moved position P0M is within the range value R1 at the time of the moved position P0M. In this case, the second arrival position P2 is adopted as the position data. Therefore, in the determination in Step 3, it is determined that the adopted data is changed "from P1 to P2". Therefore, in this case, do not proceed to step 4, the range value R1 is not increased but is returned to the initial range value R0, and return to Step 1.

Further, as illustrated in FIG. 6, the mobile body 51 moves to, for example, a moved position P0N, the first arrival position P1 and the second arrival position P2 are detected, the relative distance L1 is calculated, and the position is determined. At the moved position P0N, the range value R1 is the initial range value R0. Furthermore, the position prior to the moved position P0N (i.e., the second arrival position P2 at the time of the moved position P0M) is adopted as a new reference position P0. In the state as described above, the position of the mobile body 51 is detected and determined again.

In this way, the position detection and determination are performed repeatedly until the mobile body 51 arrives at the target object 55. As a result, the position of the position detection target object 55 is determined.

In the following, effects according to an embodiment of the present invention will be described.

In the position detection system 100, the relative distance L1 between the first arrival position P1 based on the movement history detected by the inertial sensor 15 and the second arrival position P2 based on the separation distances (D1 to D3) detected by the distance sensor 11a, is compared with the range value R1 obtained based on the movement history; and the range value R1 is changed according to the degree of an error related to the inertial sensor 15. Therefore, it is possible to detect the position of the mobile body 51 accurately.

Further, in the position detection system 100, the position of the mobile body 51 is determined with reference to the range value R1. Therefore, it is possible to detect the position of the mobile body 51 more accurately.

Further, in the position detection system 100, when the adopted position of the mobile body 51 is switched from the first arrival position P1 to the second arrival position P2, the range value R1 is returned to the initial range value R0. Therefore, it is possible to accurately determine the position of the mobile body 51 even when the moved distance of the mobile body 51 increases.

Further, in the position detection system 100, the inertial sensor 15 includes the angular velocity sensor 15a and the acceleration sensor 15b. Therefore, it is possible to detect a position of the mobile body 51 easily.

As described above, in a position detection system according to an embodiment of the present invention, the relative distance between the first arrival position based on the movement history detected by the inertial sensor and the second arrival position based on the separation distances detected by the distance sensor, is compared with the range value obtained based on the movement history; and the range value is changed according to the degree of an error related to the inertial sensor. Therefore, it is possible to detect the position of the mobile body accurately.

An embodiment of the present invention is not limited to the above-described embodiments. Various modifications may be possible without departing from the subject matter of the present invention.

DESCRIPTION OF THE REFERENCE NUMERALS 10 sensor unit
11 sensor unit RF circuit
11a distance sensor
11b transmission and reception antenna
13 sensor unit controller
15 inertial sensor
15a angular velocity sensor
15b acceleration sensor
19 sensor unit memory
20 fixed station
20-1 first fixed station
20-1a first arc
20-2 second fixed station
20-2a second arc
20-3 third fixed station
20-3a third arc
20-4 fourth fixed station
21 fixed station RF circuit
21a transmission and reception antenna
23 fixed station controller
29 fixed station memory
31 movement trajectory
32 circle
51 mobile body
55 target object
60 warehouse
63 parking space
100 position detection system
P0 reference position
P1 first arrival position
P2 second arrival position
P01 actual position
P02 actual position
P0L actual position
P0M actual position
P0N actual position
D1 separation distance
D2 separation distance
D3 separation distance
L1 relative distance
R0 range value
R1 range value

What is claimed is:

1. A position detection system comprising:
a plurality of fixed stations; and
a mobile body moving toward a target object, the mobile body having a sensor unit,
wherein the sensor unit includes:
   an inertial sensor that detects a movement history of a mobile body, the movement history including a traveling angle and a moved distance of the mobile body;
   a distance sensor that detects separation distances between the mobile body and the plurality of fixed stations based on RF communications between the sensor unit and the plurality of fixed stations; and
   a controller that perform the following procedure repeatedly:
      detecting a first arrival position based on the movement history of the mobile body,
      detecting a second arrival position based on the separation distances,
      detecting a relative distance between the first arrival position and the second arrival position,
      comparing the relative distance with a range value which starts from a predetermined initial range value,
      adopting the second arrival position as the position of the mobile body when the relative distance is less than or equal to the range value,
      adopting the first arrival position as the position of the mobile body when the relative distance is greater than the range value,
      checking if the adopted position has been changed from the first arrival position to the second arrival position,
      increasing the range value by a predetermined amount when the adopted position has not been changed from the first arrival position to the second arrival position, and
      resetting the range value to the initial range value when the adopted position has been changed from the first arrival position to the second arrival position.

2. The position detection system according to claim 1, wherein the inertial sensor includes an angular velocity sensor that detects the traveling angle by detecting an angular velocity of the mobile body, and includes an acceleration sensor that detects the moved distance by detecting an acceleration of the mobile body.

* * * * *